United States Patent [19]
Legros et al.

[11] 3,877,117
[45] Apr. 15, 1975

[54] FASTENER FOR BRACELET

[76] Inventors: Raymond Legros; André Legros, both of Le Cheylard, Ardeche, France

[22] Filed: Nov. 16, 1973

[21] Appl. No.: 416,452

[30] Foreign Application Priority Data
Feb. 5, 1973 France .............................. 73.04558

[52] U.S. Cl. ............ 24/241 SL; 24/232; 24/241 CH
[51] Int. Cl. ............................................ A44b 13/00
[58] Field of Search .. 24/230.5 CR, 230.5 S, 241 R, 24/241 CH, 241 S, 241 P, 241 PS, 241 SL, 241 SP, 241 WB, 234, 265 CC, 265 EC, 265 H, 265 SC, 230 AP, 241 SP, 241 SB, 241 PL, 232; 294/82 R, 83 R

[56] References Cited
UNITED STATES PATENTS
1,546,208  7/1925  Cunningham ................... 24/241 SB
2,236,207  3/1941  Bowder .............................. 24/232
2,652,809  9/1953  Foster .............................. 24/230 A

*Primary Examiner*—Paul R. Gilliam
*Assistant Examiner*—Kenneth J. Dorner
*Attorney, Agent, or Firm*—Karl F. Ross; Herbert Dubno

[57] ABSTRACT

A bracelet fastener comprises in combination a plate having a mortised end and a U-shaped clasp having one extremity pivoted to the plate within the mortise and the other extremity receivable in this mortise in the closed position of the clasp. The pivoted extremity has a heel and a shoulder engageable by a spring-loaded plunger to lock the clasp in its closed position or to index it on its open position.

6 Claims, 6 Drawing Figures

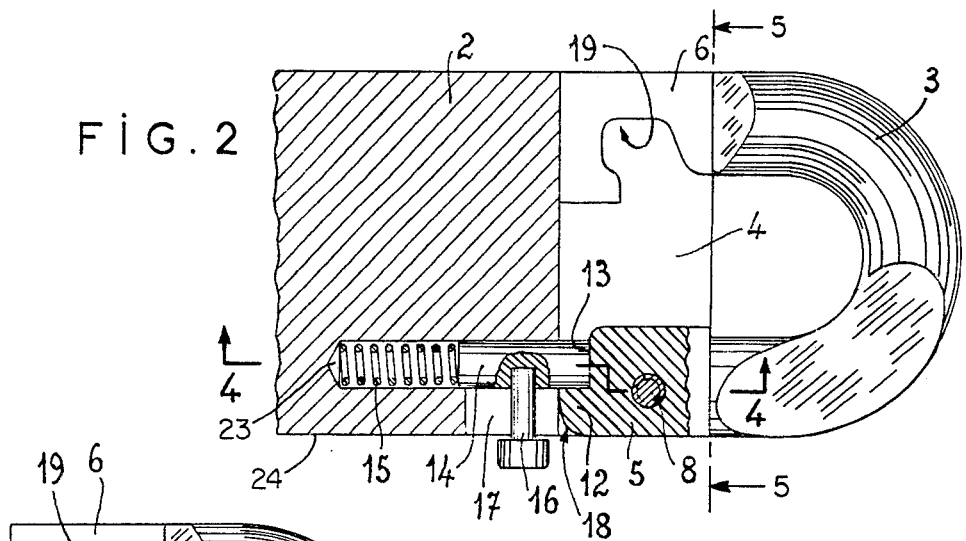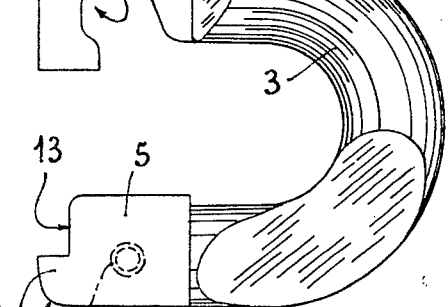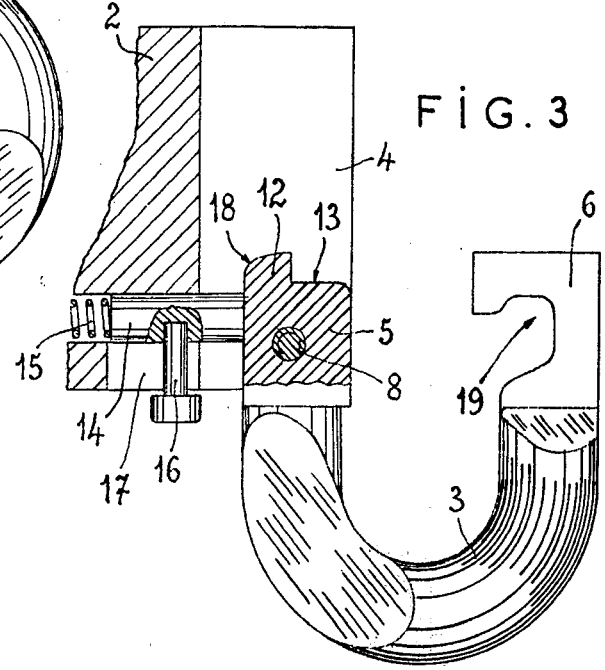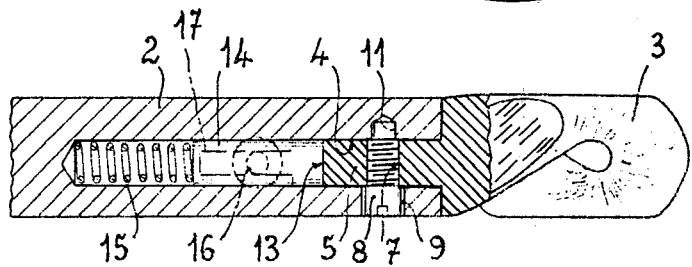

FASTENER FOR BRACELET

BACKGROUND OF THE INVENTION

Our present invention relates in general to fasteners and has particular reference to fasteners of the type used for interconnecting and locking together the ends of bracelets.

Many bracelets consist of a chain-forming ring of links. Thus, a typical example of such bracelets are those wherein one link consists of an engraved plate constituting an identity plate or tag. As a rule, these bracelets are fitted to the owner's wrist by modifying the number of links. This is jeweler's work requiring the use of suitable tools. Moreover, these bracelets must comprise a fastener enabling their easy putting on and removal. Although many fasteners are available for this purpose, they are often objectionable on account of their lack of safety, in that the bracelet is liable to open easily and thus be lost without its owner becoming aware of this loss.

SUMMARY OF THE INVENTION

It is the essential object of the present invention to avoid these inconveniences by providing a fastener enabling on the one hand the jeweler to reduce the number of links without being confronted with a difficult and long operation, and on the other hand the owner to open his bracelet very easily but without risking an accidental loss thereof.

To our end, the bracelet fastener according to this invention comprises in combination a plate having a mortised end and a U-shaped clasp constituting the end link of the bracelet chain, one extremity of this clasp being pivoted to the plate in the mortise and being releasably retainable in either an open or a closed position by resilient but retractable detent means, the other extremity of this clasp fitting in the mortise of the plate when the clasp is thus locked in its closed position.

In the case of an indentification bracelet the mortised plate may serve as an identity tag.

BRIEF DESCRIPTION OF THE DRAWING

The above and other features of our invention will now be described in detail with reference to the accompanying drawing in which FIG. 1 is a top plan view showing the clasp of a fastener embodying our invention;

FIG. 2 is a part-sectional view and part plan view of the complete fastener with the clasp of FIG. 1 in its closed and locked position;

FIG. 3 is a view similar to FIG. 2 but showing the clasp ring of FIG. 1 in its open position;

FIG. 4 is a section taken along the line 4—4 of FIG. 2;

DESCRIPTION OF THE PREFERRED EMBODIMENT

Figure 5:
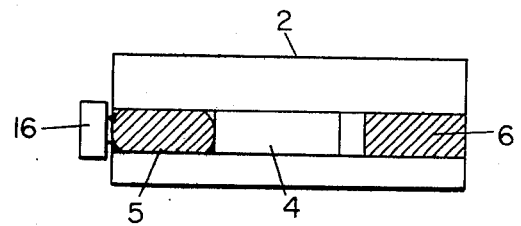
FIG. 5 is a sectional view taken on the line 5 — 5 of FIG. 2.
Figure 6:
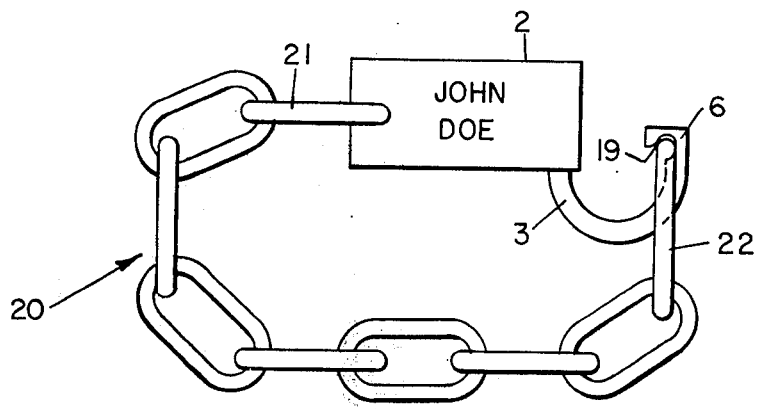
FIG. 6 is an overall view of an identification bracelet equipped with our improved fastener.

A bracelet 20 (FIG. 6) has a fastener which according to this invention comprises a plate 2 and a U-shaped clasp 3. The plate 2 is slitted across its full width, at its end facing away from the chain link 21 to which it is attached, so as to form a mortise 4 in a plane parallel to the major surfaces of the plate. The closed or locked position is that in which both extremities 5 and 6 of the clasp 3 are retained in this mortise 4. To this end, clasp extremity 5 is formed with a tapped transverse bore 7 for a screw 8 pivotally mounting the clasp 3 in this mortise. The two ends of screw 8 constitute journals fitting into bearings provided on either side of mortise 4 to permit a free swinging of clasp 3 in the plane of the mortise. A throughgoing bore 9 in the lower face of plate 2, registering with tapped hole 7, accommodates the cylindrical screw head while a blind hole 11 in the upper wall surface of mortise 4 receives the reduced and unthreaded end of this screw. Closure of the top of hole 11 is preferred for reasons of aesthetics. The clasp 3 is thus secured to the plate 2 at its extremity 5 by means of the pivot screw 8 and can swing about this screw 8 which acts as a fulcrum, extremity 5 remaining within mortise in the strap 4 in any clasp position. The other extremity 6 of the clasp 3 is also retained in the mortise 4 but can be withdrawn therefrom by rotating the clasp 3 about the pivot screw 8 to open the bracelet as shown in FIGS. 2 and 3.

Clasp extremity 5 comprises a projecting formation or heel 12. A bore 23 extending longitudinally in the body of plate 2 close to one lateral edge 24 and opening into the mortise 4 in line with extremity 5 has mounted therein a compression coil spring 15 and a plunger 14. The function of spring 15 is to urge the plunger 14 outwardly, i.e., against a shoulder 13 of clasp extremity 5 adjoining the heel 12 which bears laterally on the working end of plunger 14, thus preventing the clasp 3 from rotating to its open position. To stabilize the clasp in the closed position thereof, its extremities 6 is machined to fit snugly into the portion of mortise 4 engaged thereby. The plunger 14 has a laterally extending finger 16 emerging from the edge 23 of plate 2 through a slot 17 of limited length. This finger 16 permits manual retraction of plunger 14 against the force of the coil spring 15 to release the heel 12 so that the bracelet can be opened by rotating the clasp 3 clockwise. When the heel 12 is thus released, the finger 16 and therefore its plunger 14 can also be released, so that the tip of the plunger 14 will then engage a confronting edge 18 of heel 12. As this edge 18 acts as a guide face for the plunger 14, it is advantageously rounded to facilitate the rotation of the clasp 3 into its open position in which it is yieldably retained by detent 14, 15 as seen in FIG. 3. On the return swing of the clasp to its closed position, plunger 14 is cammed aside by the edge 18 and eventually snaps into the locking position of FIG. 2. The indexing of clasp 3 in its open position is due to the fact that the pivotal axis of pin 8, generally in line with bore 23, lies between the axis of that bore and the lateral edge 24, as seen in FIGS. 2 and 3. Extremity 6 has an undercut notch 19 on its concave side confronting the extremity 5. The function of this notch 19 is to act as a safety means for preventing the loss of the bracelet in case the clasp 3 were opened accidentally. In fact, the first annular link 22 of the bracelet 1 which in the open position can be detached from clasp 3, will thus engage in this notch 19 so as to be retained thereby and prevent the bracelet from opening completely.

From the foregoing it will be seen that the bracelet fastener according to this invention is attended by many advantageous features. Thus, it is a simple matter for the jeweler to remove links for adjusting the bracelet to the desired length, since this can be done by simply sawing ring 22. For the wearer, this fastener is particularly simple to handle and reliable in use; moreover, this fastener is not detrimental to the neat appearance of the bracelet, especially in the case of an identification bracelet where the complete locking mechanism is concealed within the thickness of the plate 2.

Of course, this invention should not be construed as being restricted to the specific embodiment and details shown and described herein by way of example, since many modifications and changes may be brought thereto, notably in connection with the shape and nature of the annular links consituting the bracelet chain, without departing from the spirit and scope of the appended claims.

What is claimed as new is:

1. A fastener for a bracelet including a chain of annular links, comprising:

a plate connected to one end of said chain, said plate having a mortise in a plane parallel to its major surfaces facing away from said one end and a longitudinal bore in said plane close to one lateral edge of said plate opening into said mortise;

a U-shaped clasp engageable with a link at the opposite end of said chain, said clasp having a first extremity permanently received in said mortise and provided with pivot means joining same to said plate at a fulcrum generally in line with said longitudinal bore for enabling said clasp to swing in said plane between an open position and a closed position, said clasp having a second extremity received in said mortise in said closed position and withdrawn from said mortise in said open position, said first extremity being provided with a projecting formation and with a shoulder transversely adjoining said formation; and slidable detent means in said plate for releasably locking said clasp in said closed position, said detent means including a spring-loaded plunger in said longitudinal bore engageable with said projecting formation and said shoulder, said plunger being provided with a transverse finger projecting from said plate for manual retraction to facilitate the opening of said clasp.

2. A fastener as defined in claim 1 wherein said first extremity is provided with a tapped transverse hole, said plate having a transverse bore in line with said tapped hole extending from one of said major surfaces to said mortise and further having an unthreaded blind hole in line with said tapped hole on a wall of said mortise opposite said transverse bore, said pivot means comprising a screw threaded into said tapped hole with a reduced end received in said blind hole and with a head received in said transverse bore.

3. A fastener as defined in claim 1 wherein said projecting formation has a camming edge engageable by said plunger upon a swing of said clasp out of said closed position for yieldably indexing same in said open position.

4. A fastener as defined in claim 1 wherein said second extremity is provided, on its side facing said first extremity, with an undercut notch for catching the engaged link at said opposite end of said chain in said open position.

5. A fastener as defined in claim 4 wherein said plate is provided with identification markings.

6. A fastener as defined in claim 1 wherein said detent means includes a coil spring in said longitudinal bore held compressed by said plunger.

* * * * *